United States Patent [19]

Luria

[11] Patent Number: 5,567,108
[45] Date of Patent: Oct. 22, 1996

[54] TRANSFER APPARATUS FOR TRANSFERRING ARTICLE HOLDERS, PARTICULARLY FOR TRANSFERRING CART CARRIERS IN A STORAGE COMPARTMENT

[75] Inventor: David Luria, Tel Aviv, Israel

[73] Assignee: Fuselage Engineering Services Ltd., Tel Aviv, Israel

[21] Appl. No.: 228,287

[22] Filed: Apr. 15, 1994

Related U.S. Application Data

[63] Continuation-in-part of Ser. No. 121,407, Sep. 15, 1993, Pat. No. 5,413,292.

[30] Foreign Application Priority Data

Apr. 18, 1993 [IL] Israel .......................................... 105451

[51] Int. Cl.⁶ ..................................................... B64D 11/04
[52] U.S. Cl. ............................. 414/518; 414/507; 410/77; 244/118.1
[58] Field of Search ................................ 414/507, 518, 414/527, 539, 559, 679; 410/76, 77, 80, 84; 244/118.1, 137.1; 198/345.3

[56] References Cited

U.S. PATENT DOCUMENTS

| | | | |
|---|---|---|---|
| 2,478,019 | 8/1949 | Sonntag | 410/77 X |
| 2,575,326 | 11/1951 | Anderson | 410/84 |
| 3,642,158 | 2/1972 | Koennecke et al. | |
| 3,741,504 | 6/1973 | Alberti et al. | |
| 3,906,870 | 9/1975 | Alberti | 244/137.1 X |
| 4,022,404 | 5/1977 | Greiss | |
| 4,066,227 | 1/1978 | Buchsel | 105/340 X |
| 4,203,372 | 5/1980 | Ivanov et al. | 244/137.1 X |
| 4,234,278 | 11/1980 | Harshman et al. | 410/69 |
| 4,349,302 | 9/1982 | Ferguson, Jr. | 410/69 |
| 4,502,585 | 3/1985 | Sticht | 198/345.3 |
| 4,648,570 | 3/1987 | Abdelmaseh et al. | 244/118.1 |
| 4,660,787 | 4/1987 | Sprenger et al. | 244/118.5 |
| 4,875,645 | 10/1989 | Courter | 244/118.1 X |
| 4,925,132 | 5/1990 | Zider | 244/118.1 |
| 4,966,513 | 10/1990 | Motoda | 414/277 |
| 5,074,496 | 12/1991 | Rezag et al. | 244/118.1 |
| 5,123,517 | 6/1992 | Windau | 198/463.3 |
| 5,159,994 | 11/1992 | Luria | 186/40 |
| 5,205,515 | 4/1993 | Luria | 244/118.5 |
| 5,314,143 | 5/1994 | Luria | 244/118.1 |
| B1 3,517,899 | 1/1983 | Vernon | 244/118.5 |

FOREIGN PATENT DOCUMENTS

| | | | |
|---|---|---|---|
| 2148355 | 4/1973 | Germany . | |
| 4029628 | 10/1991 | Germany . | |
| 0035045 | 3/1977 | Japan | 410/80 |

*Primary Examiner*—Karen B. Merritt
*Assistant Examiner*—James W. Keenan
*Attorney, Agent, or Firm*—Ladas & Parry

[57] ABSTRACT

Transfer apparatus for transferring an article holder, particularly a cart carrier, from one location to another location in a compartment, includes a carriage movable longitudinally of a framework in the compartment, a drive for the carriage, a coupling device carried by the carriage, a locking device carried by the framework, and an actuator which actuates the coupling device and the locking device to either a locking position or to a released position with respect to the article holder. The actuator includes an actuator member movable to a plurality of positions when actuated, including: (a) a first position wherein the locking device is in its locking position and the coupling device is in its released position; (b) a second position, wherein the locking device is in its locking position and the coupling device is in its coupling position; and (c) a third position, wherein the locking device is in its released position, and the coupling device is in its coupling position.

20 Claims, 12 Drawing Sheets

TRANSFER APPARATUS FOR TRANSFERRING ARTICLE HOLDERS, PARTICULARLY FOR TRANSFERRING CART CARRIERS IN A STORAGE COMPARTMENT

RELATED APPLICATION

The present application is a continuation-in-part of patent application Ser. No. 08/121,407, filed Sep. 15, 1993, and assigned to the same assignee as the present application.

FIELD AND BACKGROUND OF THE INVENTION

The present invention relates to transfer apparatus for transferring article holders from one location to another in a compartment. The invention is particularly useful, and is therefore described below, in transfer apparatus for transferring cart carriers in a storage compartment provided in a vehicle cabin construction as described in the above-cited patent application Ser. No. 08/121,407, now U.S. Pat. No. 5,413,292.

BRIEF SUMMARY OF THE INVENTION

According to the present invention, there is provided transfer apparatus for transferring an article holder from one location to another location in a compartment, comprising: a framework extending longitudinally of the compartment; a carriage movable longitudinally of the framework; a drive for the carriage; a coupling device carried by the carriage; a locking device carried by the framework; and an actuator for actuating the coupling device and the locking device to either a locking position or to a released position with respect to the article holder. The actuator comprises an actuator member movable to a plurality of positions when actuated, including: (a) a first position wherein the locking device is in its locking position and the coupling device is in its released position; (b) a second position, wherein the locking device is in its locking position and the coupling device is in its coupling position; and (c) a third position, wherein the locking device is in its released position, and the coupling device to its coupling position.

According to further features in the preferred embodiment of the invention described below, the actuator member is a lever pivotal above a pivot point to the carriage. One end of the lever actuates the locking device, and the opposite end of the lever actuates the coupling device. The locking device comprises a locking pin movable by the pivotal lever to a locking position into engagement with the article holder for locking the article holder to the framework, or to a released position releasing the article holder from the framework. The coupling device comprises a coupling pin movable by the pivotal lever to a coupling position in engagement with the article holder for coupling the article holder to the carriage and thereby to move therewith, or to a released position releasing the article holder from the carriage.

BRIEF DESCRIPTION OF THE DRAWINGS

The transfer apparatus of the present application, as well as its many advantages, will be better understood from the description below taken in conjunction with the accompanying drawings, wherein:

FIGS. 6a–6c illustrate the three positions of the pivotal lever which actuates the locking and coupling devices, corresponding to the three positions of the actuator member in FIG. 5a;

DESCRIPTION OF PREFERRED EMBODIMENTS

The Embodiment of FIGS. 1–6c

The transfer apparatus illustrated in FIGS. 1–6c of the drawings is particularly useful in the aircraft cabin construction described in our patent application Ser. No. 08/121,407, filed Sep. 15, 1993 now U.S. Pat. No. 5,413,292, for transferring article holders, in that case cart carriers, from one location to another in a storage compartment extending in a space between the outer fuselage wall of the aircraft and the ceiling of the passenger compartment. An open framework, generally designated 315 (and corresponding to framework 115 in the above patent application), is constructed in this space and defines two storage compartments 315a, 315b for storing two lines of wheeled carts (not shown), each cart being carried by a cart carrier 318. Framework 315 may extend for the complete length of the passenger compartment, or for only a part of its length. The transfer apparatus further includes a transverse transfer mechanism, and a plurality of elevators (not shown) located at spaced intervals along the length of the framework 315 for lowering the cart carriers 318 from their respective storage compartments 315a, 315b to the deck of the main passenger compartment, or for raising the cart carriers from the deck of the passenger compartment to the storage compartment.

Further details of the construction of the aircraft cabin, the storage compartments therein, the cart carriers 318 movable within the storage compartments, the longitudinal and transverse transfer mechanims for transferring the cart carriers within the storage compartments, and the elevators for raising the lowering the cart carriers, are described in the above-cited Patent application Ser. No. 08/121,407, now U.S. Pat. No. 5,143,292, which application is hereby incorporated by reference.

The present application is concerned primarily with improvements in the longitudinal transfer mechanism for transferring the cart carriers 318 within their respective storage compartments, the coupling devices for coupling the cart carriers to the longitudinal transfer mechanism, and the locking devices for locking the cart carriers to the framework 315 when the cart carriers are not being transferred during a transfer operation.

Figure 3:
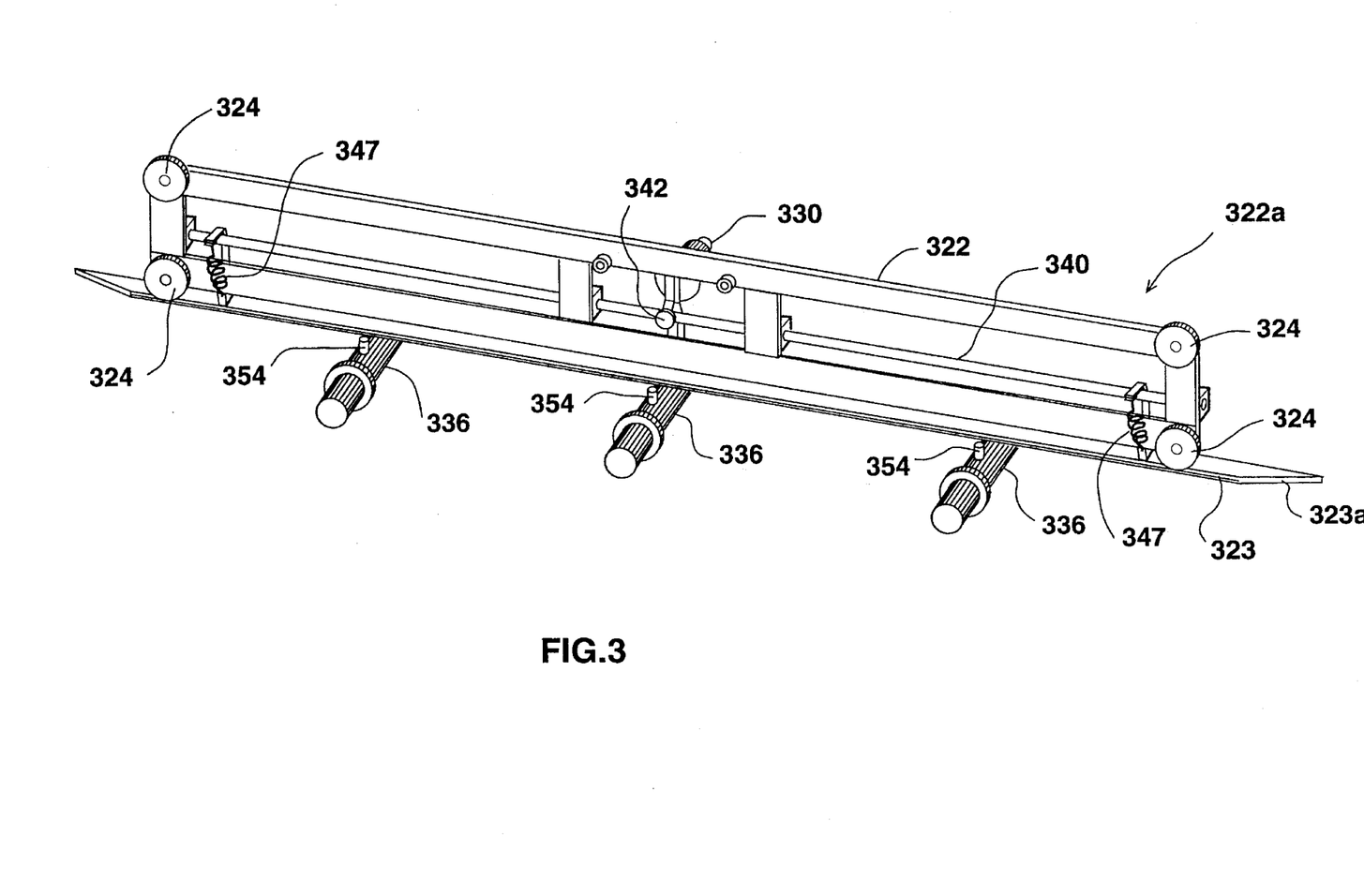
FIG. 3 is a three-dimensional view illustrating the main elements of the carriage in the transfer apparatus of FIG. 1.

The transfer apparatus illustrated in the drawings includes, for each storage compartment 315a, 315b, a pair of carriages 322a, 322b (FIG. 1), each corresponding to carriage 122 in the above-identified patent application for transferring the cart carriers 318 longitudinally of the respective storage compartment. As shown in FIG. 3, each carriage (e.g., 322a) includes an actuator bar 323 which moves longitudinally with the carriage and is effective to move locking pins to their released positions, as will be described more particularly below. Each carriage is mounted on a plurality of rollers 324 movable within tracks 326 (FIG. 1) carried by the framework 315 and is driven longitudinally of the framework by a motor Ma (FIG. 5) coupled to the carriage by a closed loop cable 328.

Figure 1:
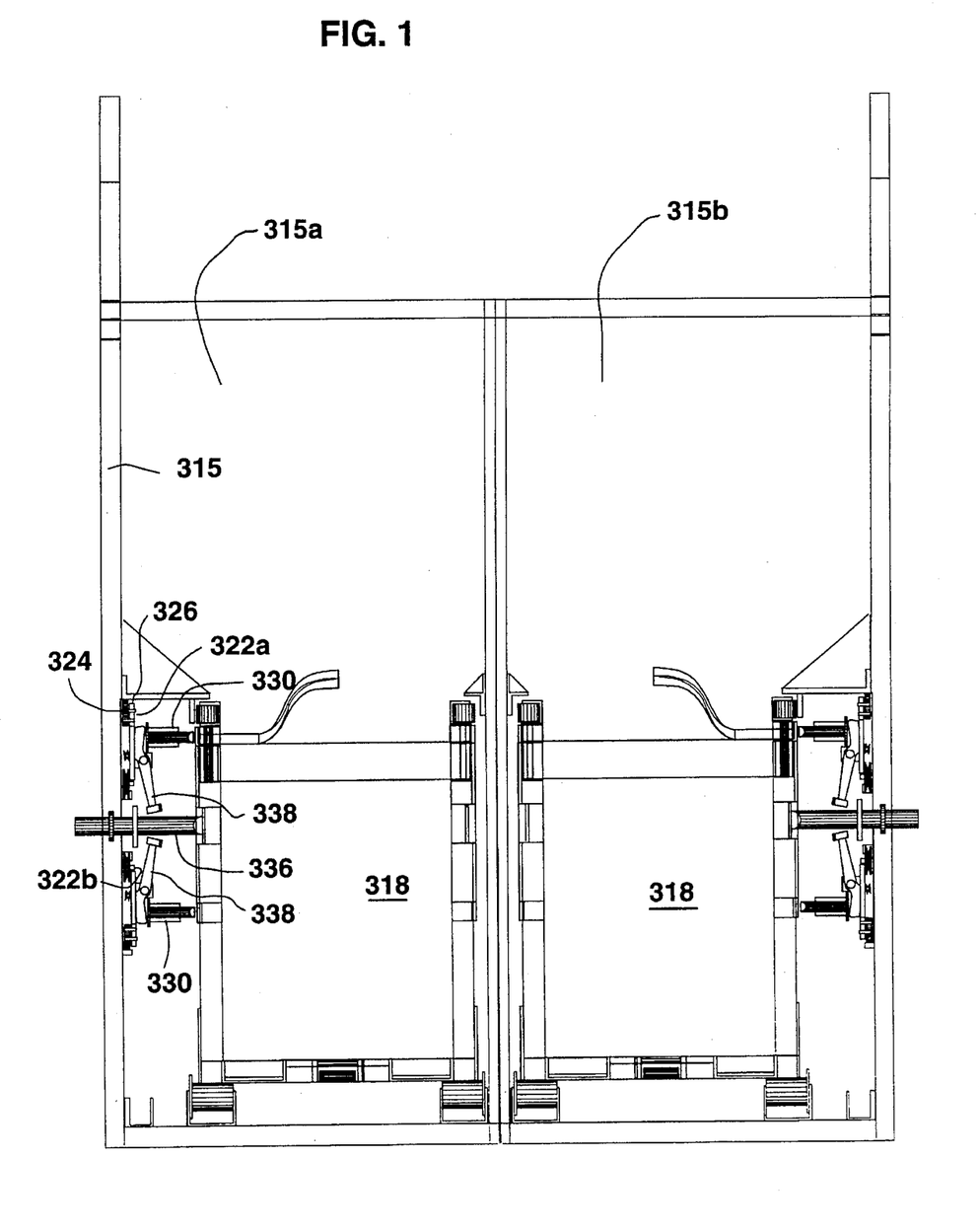
FIG. 1 is an end elevational view illustrating one form of transfer apparatus constructed in accordance with the present invention.
Figure 2:
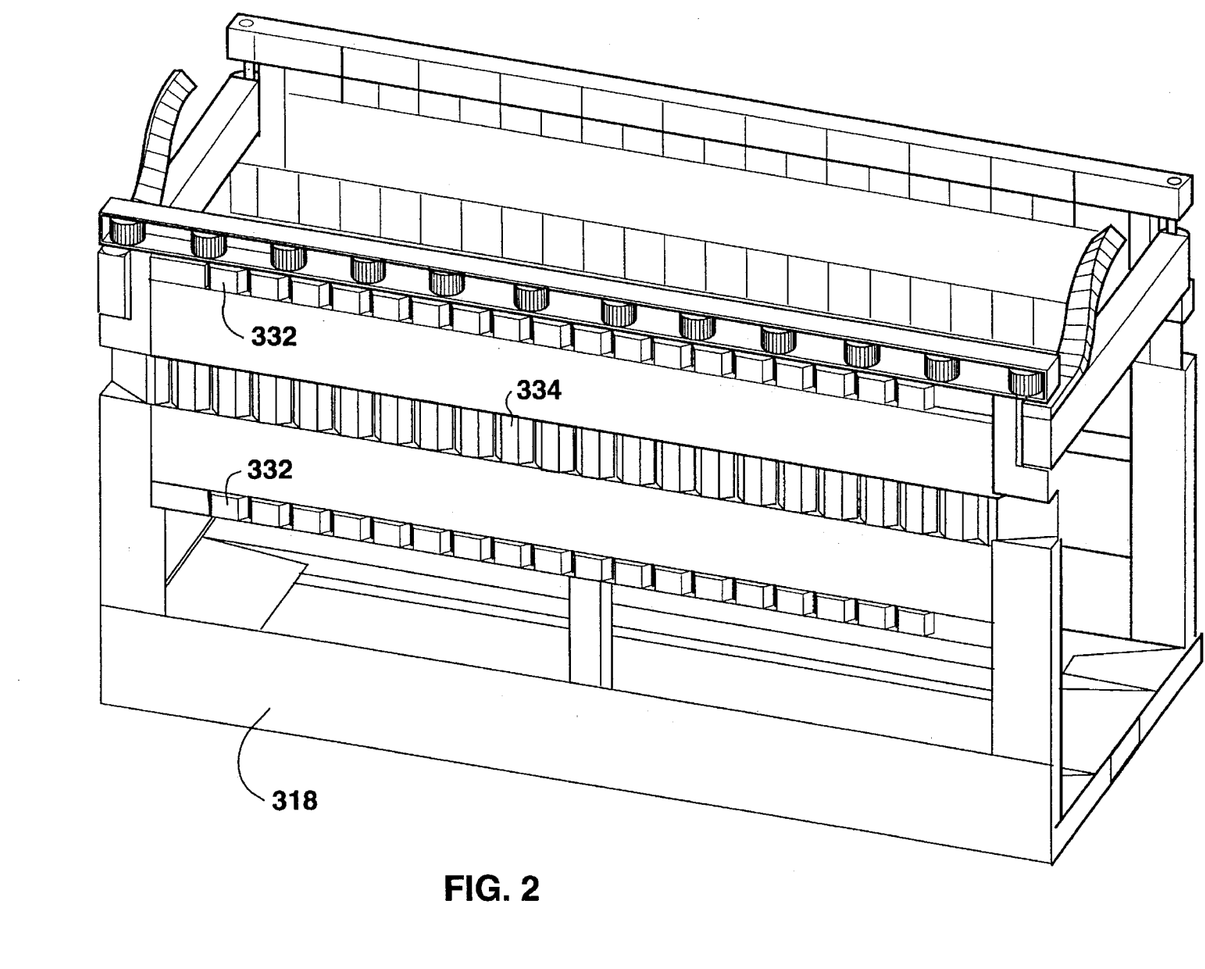
FIG. 2 is a perspective view illustrating the article holder, in this case a cart carrier, handled by the transfer apparatus of the present application.

Each carriage 322 further includes a coupling device 330 in the form of a pin receivable in the spaces between teeth 332 formed on the outer face of the cart carriers 318. Thus, as seen in FIG. 2, each cart carrier 318 includes two lines of teeth 332 extending longitudinally of the cart carrier. The upper line of teeth 332 is cooperable with coupling pin 330 of the upper carriage 322a, and the lower line is cooperable with coupling pin 330 of the lower carriage 322b.

Each cart carrier 318 includes a further line of teeth 334 intermediate the two lines 332. Teeth 334 are cooperable with a plurality of locking pins 336 (FIG. 1) carried by the framework 315 for locking the cart carrier 318 against any movement when the cart carrier is not being transferred by one of the carriages 322a, 332b. Each carriage 322a, 322b further includes a pivotal lever 338 which may be selectively actuated to move the coupling pins 330 and locking pins 336 to their engaged or released positions with respect to the cart carrier 318. The cart carriers 318 may otherwise be constructed as described in the above-identified patent application.

Figure 4:
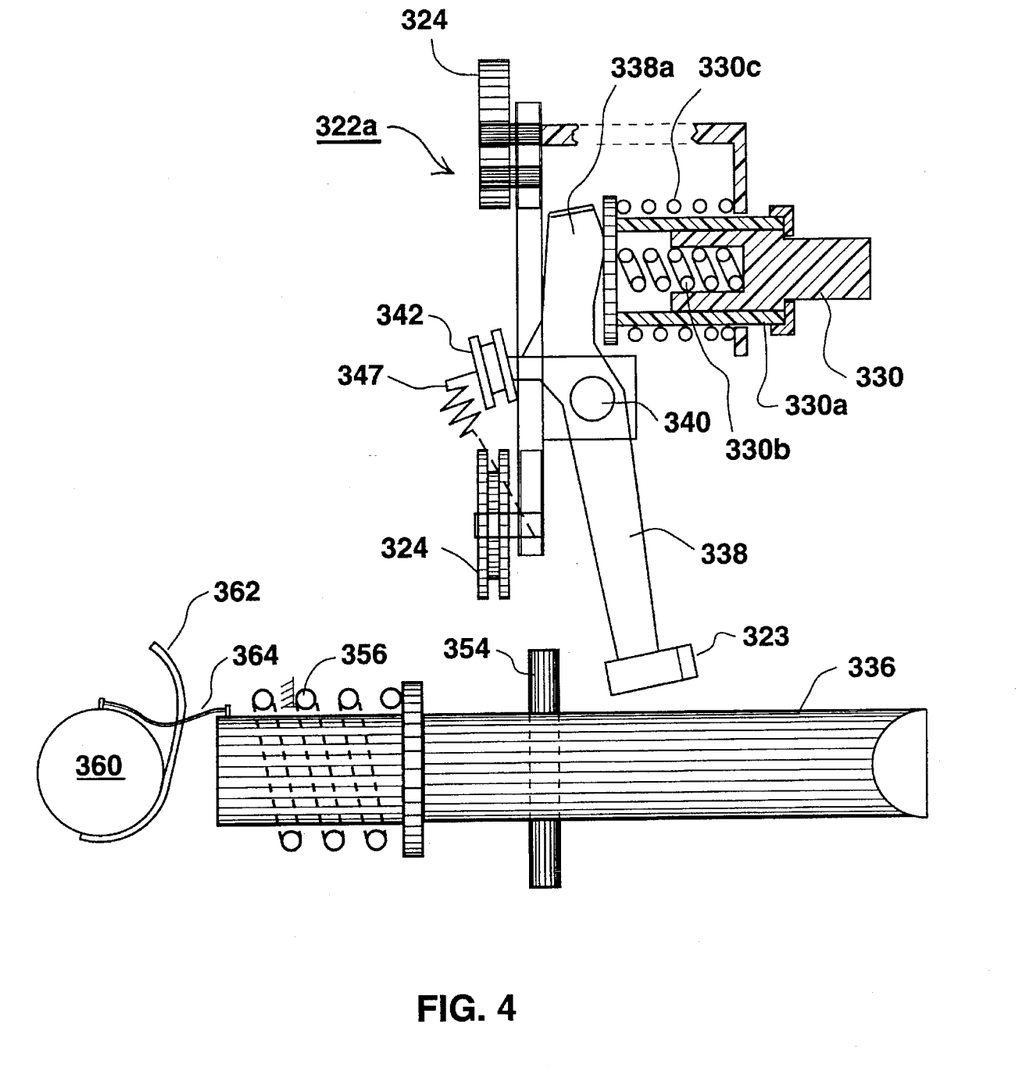
FIG. 4 is an end elevational view illustrating the main elements of the locking device for locking the cart carrier to the framework, and also the coupling device for coupling the cart carrier to the carriage of FIG. 3 when the cart carrier is to be moved to another location within the storage compartment.
Figures 5, 5A:
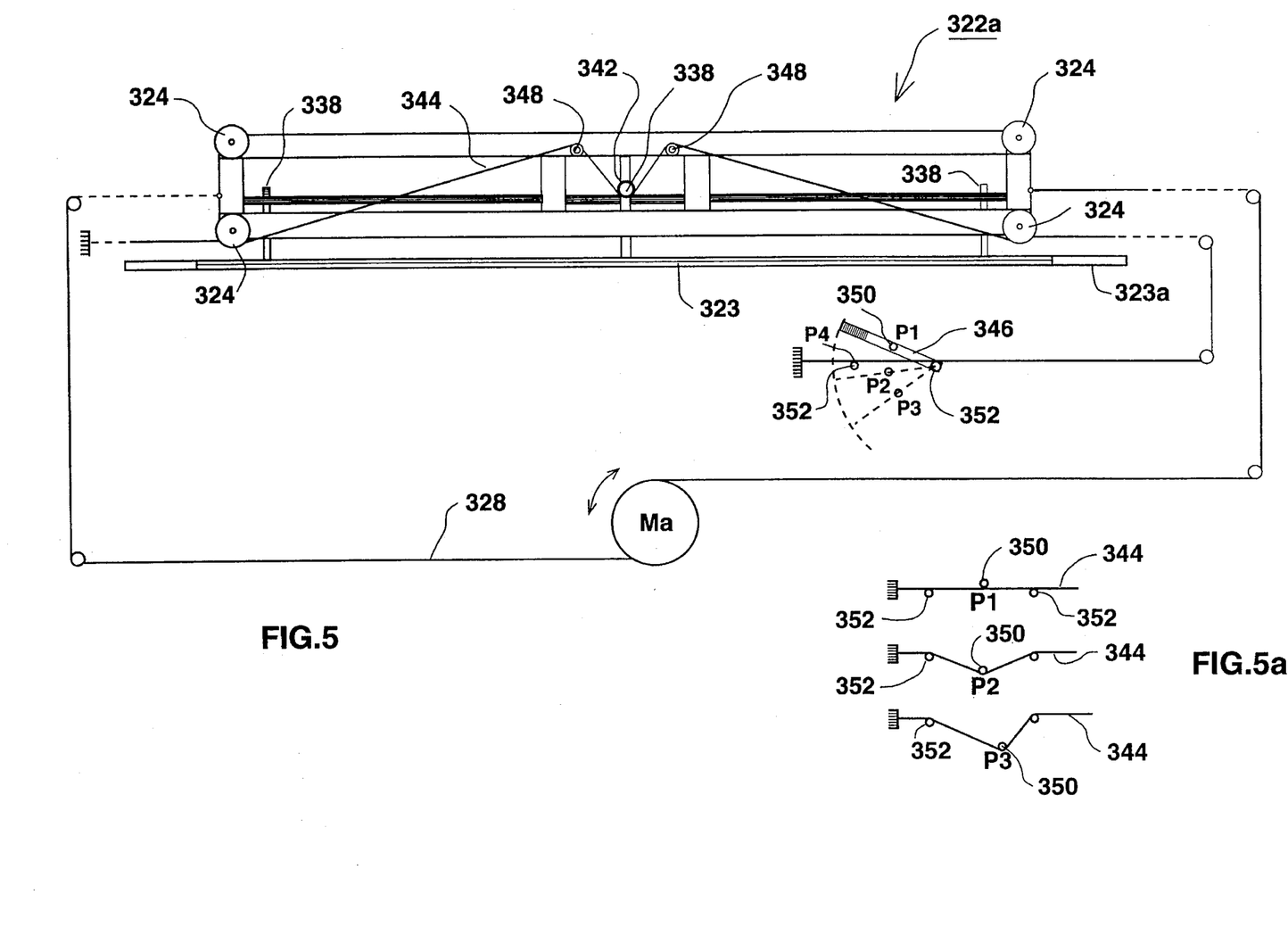
FIG. 5 illustrates the main elements of the carriage, its drive, and the actuator for actuating the locking and coupling devices.
FIG. 5a is a diagram illustrating the three positions of the actuator for actuating the locking and coupling devices.

FIG. 4 more particularly illustrates the manner in which the pivotal levers 338 carried by the two carriages (only carriage 322a being shown in FIG. 4) actuate the coupling pins 330 carried by the carriages, and the locking pins 336 carried by the framework 315. Each carriage 322a, 322b, includes three pivotal levers 338, as shown in FIG. 5, all fixed to a shaft 340 extending longitudinally of the respective carriage. The lower ends of the three levers 338 carry the actuator bar 323. The center lever 338 carries a roller 342 which is engaged by a cable 344 controlled by an actuator member 346 to pivot all three levers 338 of the carriage about the longitudinal axis of shaft 340 against the force of spring 347 at the opposite ends of the shaft 340 and the frame of carriage 322 (FIGS. 3 and 4).

Thus, as shown in FIG. 5, the opposite ends of cable 344 are fixed to the stationary framework 315, and the cable 344 is passed over a pair of rollers 348 carried by the carriage on opposite sides of roller 342, and under the latter roller 342. Actuator member 346 is pivotal at one end, and carries a roller 350 which engages the upper side of cable 344. The underside of the cable is engaged by a pair of rollers 352 on opposite sides of roller 350 and fixed to the stationary framework 315.

Figure 6A:
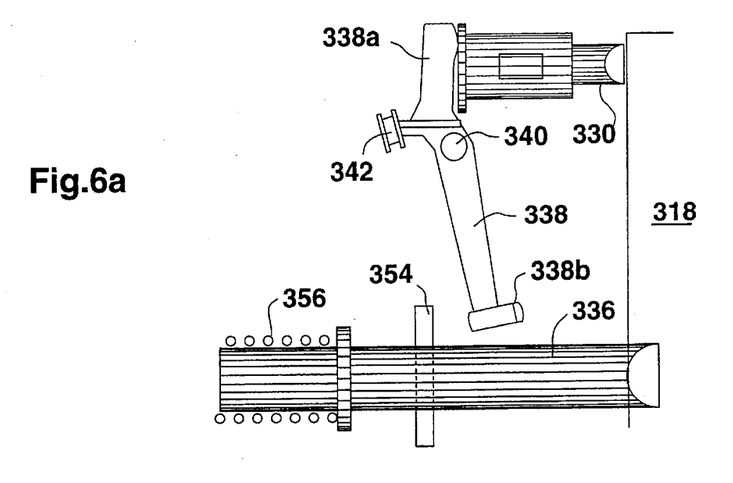
Figure 6B:
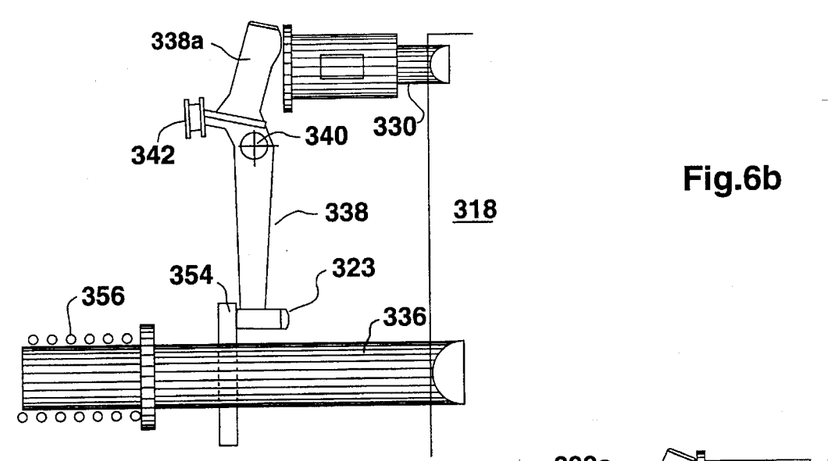
Figure 6C:
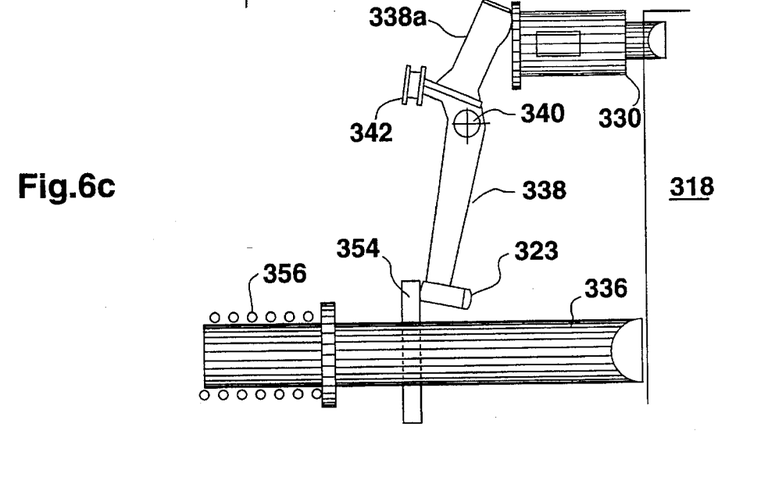

The arrangement is such that when actuator lever 346 is in the position A (FIG. 5a), the cable 344 engaging the underside of roller 342 on lever 338 causes the lever to assume the position illustrated in FIG. 6a; and when actuator lever 346 is moved to positions B, C, its roller 350 engages cable 344 to cause the cable to move roller 342 carried by lever 338, and thereby to move the lever to the positions illustrated in FIGS. 6b and 6c respectively.

One end 338a of the center lever 338 actuates the coupling pin 330 for coupling or decoupling the cart carrier 318 to the carriage; and the opposite ends of the three levers 338 carry the actuator member 323 which is engageable with a roller 354 carried by each of the locking pins 336. Coupling pin 330 is slidable within a housing 330a and is urged outwardly by a coil spring 330b, the housing 330a being urged against end 338a of lever 338 by another coil spring 330c. Each locking pin 336 is normally urged to its locking position by a coil spring 356, but may be moved to a released position by actuator bar 323 carried at the end of the levers 338 and engageable with roller 354 carried by the locking pin. The foregoing operations will be described more particularly below with respect to FIGS. 6a–6c.

As shown in FIG. 4, the apparatus further includes a locking shaft 360 which extends longitudinally of the framework 315 adjacent to one end of all the locking pins 336 in each side of the framework 315. Locking shaft 360 includes a leaf spring 362 which, when the locking shaft is rotated clockwise in FIG. 4, engages all the ends of the locking pins 336 and firmly presses them against the cart carrier 318 to immobilize the cart carrier, e.g., during taking-off or landing the aircraft. Locking shaft 360 further includes a cable 364 connected to the end of each of the locking pins 336 such that when the locking shaft is rotated counter-clockwise, cables 364 move all the locking pins to their released positions, i.e., out of engagement with the teeth 334 of the cart carrier 318, e.g., to permit a quick loading or unloading of the cart carriers with respect to their storage compartments. During all operation times, the locking shaft 360 is in the position illustrated in FIG. 4, wherein neither leaf spring 362 nor the cables 364 are effective, so that the position of the locking pins 336 would be determined by their biasing springs 356, the positions of their respective levers 338, and also by the actuator member 323 (FIG. 3) of the carriages 322a, 322b.

The transfer apparatus illustrated in the drawings may be operated as follows:

When the aircraft is on the ground, locking shaft 360 (FIG. 4) may be rotated counter-clockwise, to cause its cables 364 to move all the locking pins 336 to their released positions, out of engagement with the teeth 334 of the cart carriers 318. This facilitates quick loading and/or unloading of the cart carriers with respect to their storage compartments, e.g., 315a and 315b.

When the aircraft is taking off, locking shaft 360 is rotated clockwise, to cause its leaf spring 362 to press against the ends of all the locking pins 336, and thereby to firmly force the locking pins against the cart carrier 318. This securely immobilizes the cart carriers from any movement during take-off. At all other times, locking shaft 360 would be in the position illustrated in FIG. 4, so that neither its leaf spring 362 nor its cables 364 are effective with respect to the locking pins 336.

The actuator lever 346 (FIG. 5), however, now becomes effective in controlling the positions of the locking pins 336, as well as the positions of the coupling pins 330 carried by the carriages 322a, 322b.

Thus, when actuator lever 346 is in its position A (FIGS. 5 and 5a), wheel 342 engaged by the cable 344 controlled by the actuator lever 346 is in the position illustrated in FIGS. 5 and 6a. As shown particularly in FIG. 6a, the end 338a of lever 338 cooperable with the coupling pin 330 permits the spring 347 (FIG. 3) to pivot the lever to the position illustrated in FIG. 6a, wherein the coupling pin 330 is disengaged from the teeth 332 (FIG. 2) of the cart carrier 318. In addition, actuator bar 323 carried at the opposite ends of the levers 338 is out of engagement with roller 354 carried by the locking pin 336, so that the spring 356 of each locking pin urges the locking pin into its locking position with respect to teeth 334 of the cart carrier 318. Thus, in position A (FIGS. 5, 5a) of the actuator lever 346, the locking pins 336 are in locking position with respect to the cart carrier 318, and the coupling pins 330 are in released position with respect to the cart carrier.

Whenever it is desired to transfer a cart carrier longitudinally of its compartment 315a, actuator lever 346 is first moved to position B, and then to position C.

When the actuator lever 346 is moved to position B, its cable 344 is tightened and moves roller 342 slightly laterally, which causes the levers 338 to move to the positions illustrated in FIGS. 6b. In this position of the levers 338, end lever 338a engages its coupling pin 330 to move it to the engaged or coupling position with respect to the cart carrier 318, while actuator bar 323 carried by the three levers 338 just comes into contact with the roller 354 of the respective locking pin 336, but has not yet moved the locking pin from its locking position. Accordingly, when actuator lever 346 is in position B, both the locking pins 336 and the coupling pins 330 are in engaged positions with respect to the cart carrier 318.

However, as soon as actuator lever 346 reaches position C, its cable 344 moves roller 342 a further distance transversely of the carriage, to the position illustrated in FIG. 6c. In this position, actuator bar 323 at the ends of the three levers 338 has engaged roller 354 of the locking pins 336 to move the locking pins to their released condition with respect to the cart carrier, so that only the coupling pins 330 now engage the cart carrier.

Motor Ma (FIG. 5) then moves the carriage 322 longitudinally of the compartment 315a, and thereby conveys with it the cart carrier engaged by its coupling pins 330. During this movement of the carriage 322a or 322b, the tapered end 323a of its actuator bar 323 engages the rollers 354 of the other locking pins 336, and thereby moves those locking pins to their released condition until the carriage passes.

The provision of two carriages 322a, 322b, acting independently, increases the speed of transfer of a cart carrier 318 since the closest carriage to a cart carrier to be moved could be activated. In addition, the provision of two carriages provides more reliable operation in case one carriage should malfunction. The arrangement of locking pins and coupling pins and the above-described manner in which they are actuated, also provides more reliable operation, and enables any position in the compartment to be used for storage, not only between the locks as in the previous embodiment. A further advantage in the illustrated arrangement is that all the motors (e.g., motor Ma as well as the motor {not shown} to actuate the actuator lever 346) are mounted on stationary members and not moving members.

Modifications of FIGS. 7–14

Figures 7, 8:
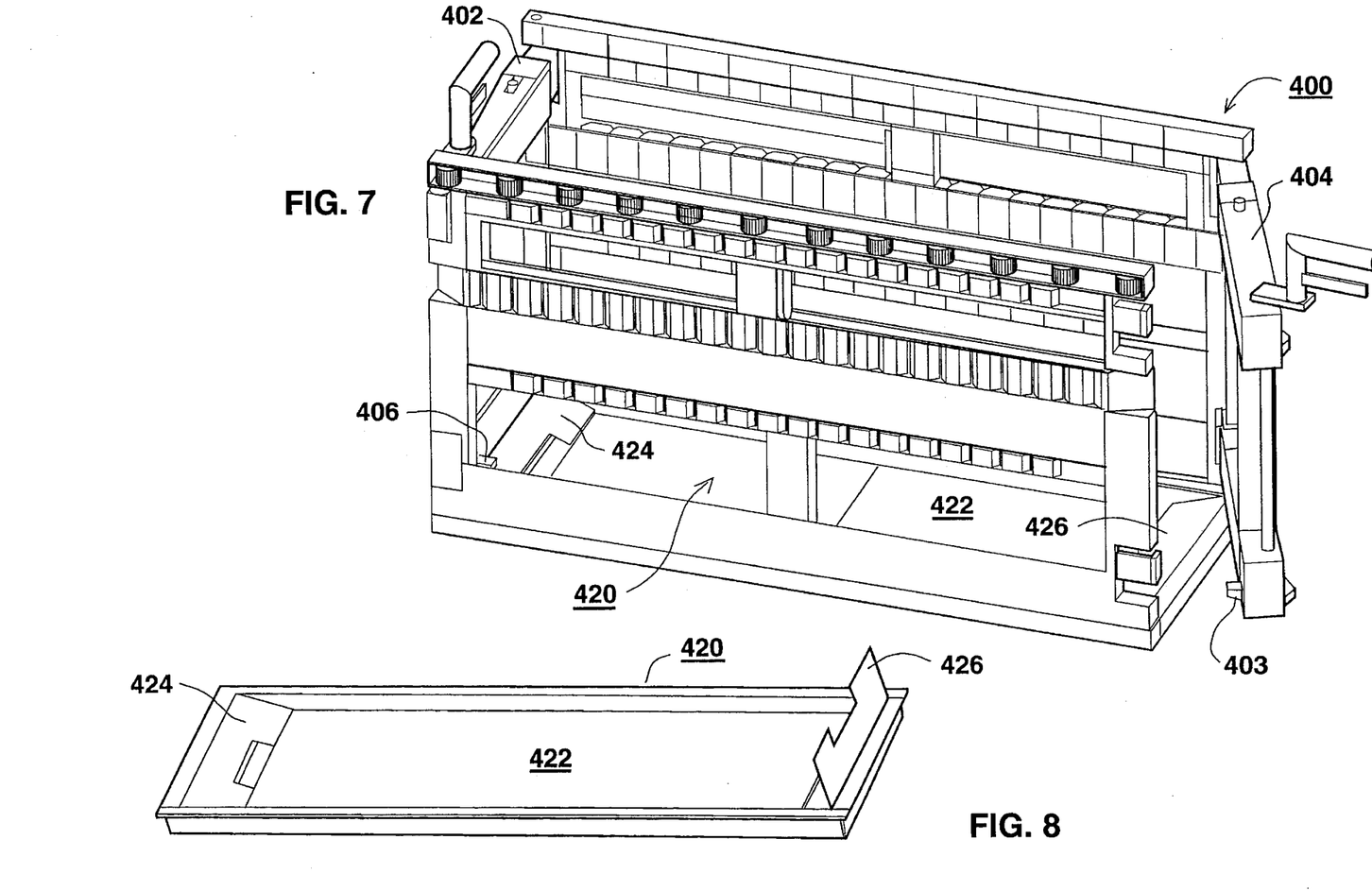
FIG. 7 is a perspective view illustrating a modification in the construction of the cart carrier of FIG. 2.
FIG. 8 is a perspective view more particularly illustrating the drip pan in the cart carrier of FIG. 7.

FIG. 7 illustrates a modification in the construction of the cart carrier, therein designated 400. In this modification, the cart carrier includes two pivotal members 402, 404, at its opposite ends, each formed with a locking tooth 406, 408 at its lower ends for anchoring the cart within the carrier.

Figure 9:
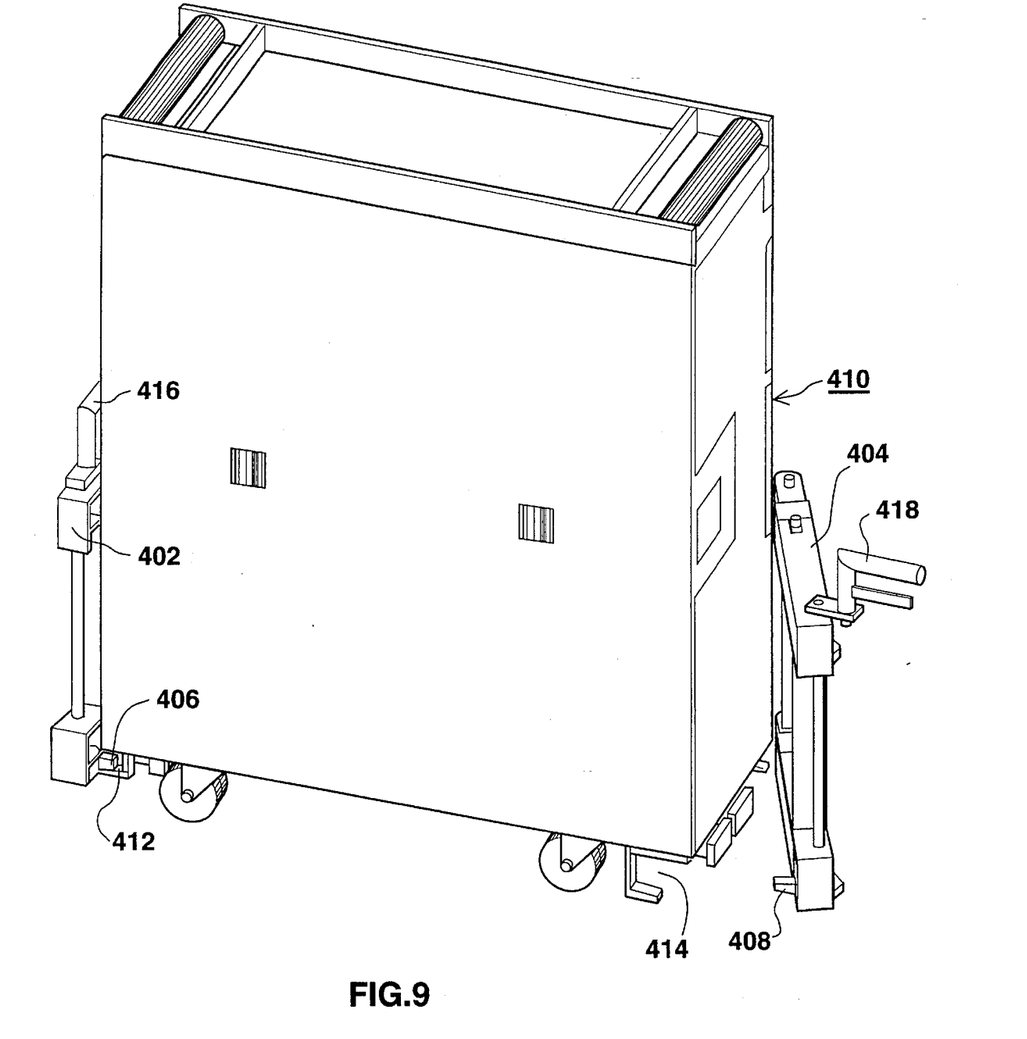
FIG. 9 illustrates a cart for use with the cart carrier of FIG. 7.

The cart for use with the carrier 400 of FIG. 7 is more particularly illustrated in FIG. 9, and is therein generally designated 410. It will be seen that the bottom of the cart is formed at its two opposite ends with a socket member 412, 414 for receiving the teeth 406, 408, respectively, when the pivotal members 402 and 404 are pivoted to their closed positions. Each pivotal member 402, 404 further includes a handle 416, 418, respectively, for pivoting the members to their closed positions and for locking them in such positions.

The cart carrier 400 illustrated in FIG. 7 is further provided with a drip pan 420 at its lower end for catching drippings from the food contained in the carts carried by the carrier. Drip pan 420 includes a bottom plate 422 which is removable for cleaning, and a pair of inclined ramps 424, 426 at its opposite sides, which ramps are pivotal to an open position, as shown in FIG. 8, to permit removal of the plate 422 for cleaning purposes.

The cart carrier 400 illustrated in FIG. 7, and the cart 410 for use therein as illustrated in FIG. 9, are otherwise constructed as described earlier.

Figures 10, 11:
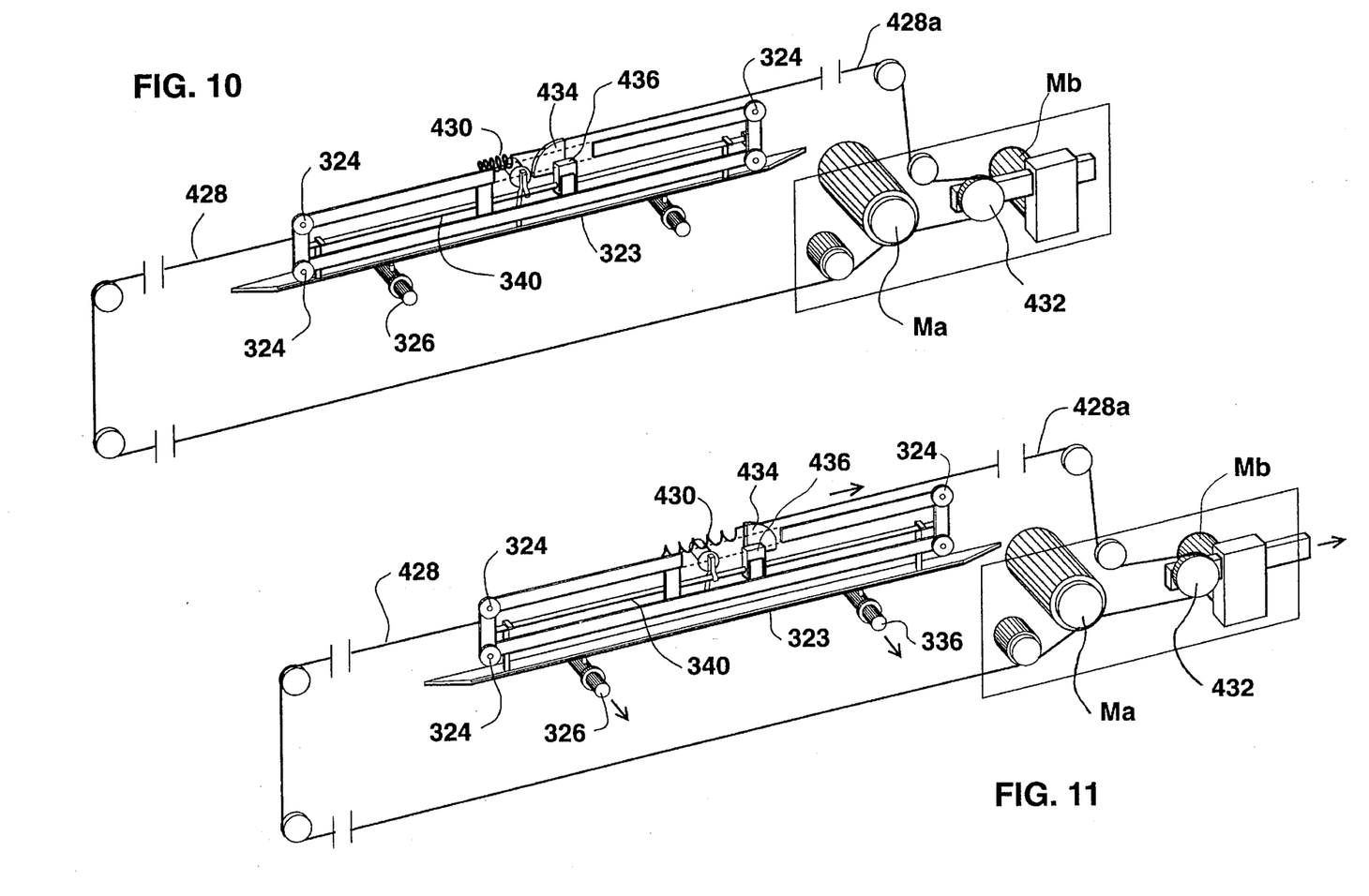
FIG. 10 is a view similar to that of FIG. 5 but illustrating a modification in the construction of the carriage drive and the actuator for actuating the locking and coupling devices.
FIG. 11 is a view corresponding to that of FIG. 10 but illustrating the actuator in another position.

FIGS. 10 and 11 illustrate a modification in the construction of the carriage drive and the actuators for actuating the locking and coupling devices. In this modification, the same closed loop cable used for the carriage drive is also used in the actuator for actuating the locking and coupling devices, as distinguished from the arrangement illustrated in FIG. 5 wherein a separate cable is used for the actuator.

The single closed loop cable in the carriage drive is designated 428, and corresponds to cable 328 in the FIG. 5 arrangement. Closed loop cable 428 is driven by a drive motor Ma.

In the arrangement illustrated in FIGS. 10 and 11, shaft 340, which pivots the levers 338 (FIG. 4) to the positions illustrated in FIGS. 6a–6c, is pivoted by actuator motor Mb which moves a tensioning member 432 engaging a stretch of 428a of the closed-loop cable 428 to pivot a sector member 434 against the action of spring 430. Sector member 434 is coupled by a gear 436 to shaft 340 so as to rotate the shaft when sector 434 is pivoted. Shaft 340 is otherwise coupled to the levers 338 to actuate the coupling devices 330 (FIG. 4) and the locking pins 336 in the manner described above.

It will thus be seen that member 432 varies the tension of the closed loop cable 428 in order to expand or contract the spring section 430 and thereby to control the effective length of the closed loop cable 428; and that the levers 338, which serve as actuator members for actuating the coupling pins 330 and locking pins 336, are coupled to the closed loop cable 428 via shaft 340, gearing 436 and pivotal sector 434, such that the levers are moved to their respective positions, as illustrated in FIGS. 6a–6c, in accordance with the effective length of the closed loop cable 428.

FIG. 10 illustrates the condition of the actuator mechanism when the levers 338 are in their locking positions as shown in FIG. 6a; whereas FIG. 11 illustrates the conditions of the actuator mechanism when the levers 338 are in their coupling positions as illustrated in FIG. 6c.

The arrangement illustrated in FIGS. 10 and 11 thus utilizes a single closed loop cable 428 for performing the functions of both the closed loop cable 328 and the actuator cable 344 in the arrangement illustrated in FIG. 5.

Figure 12:
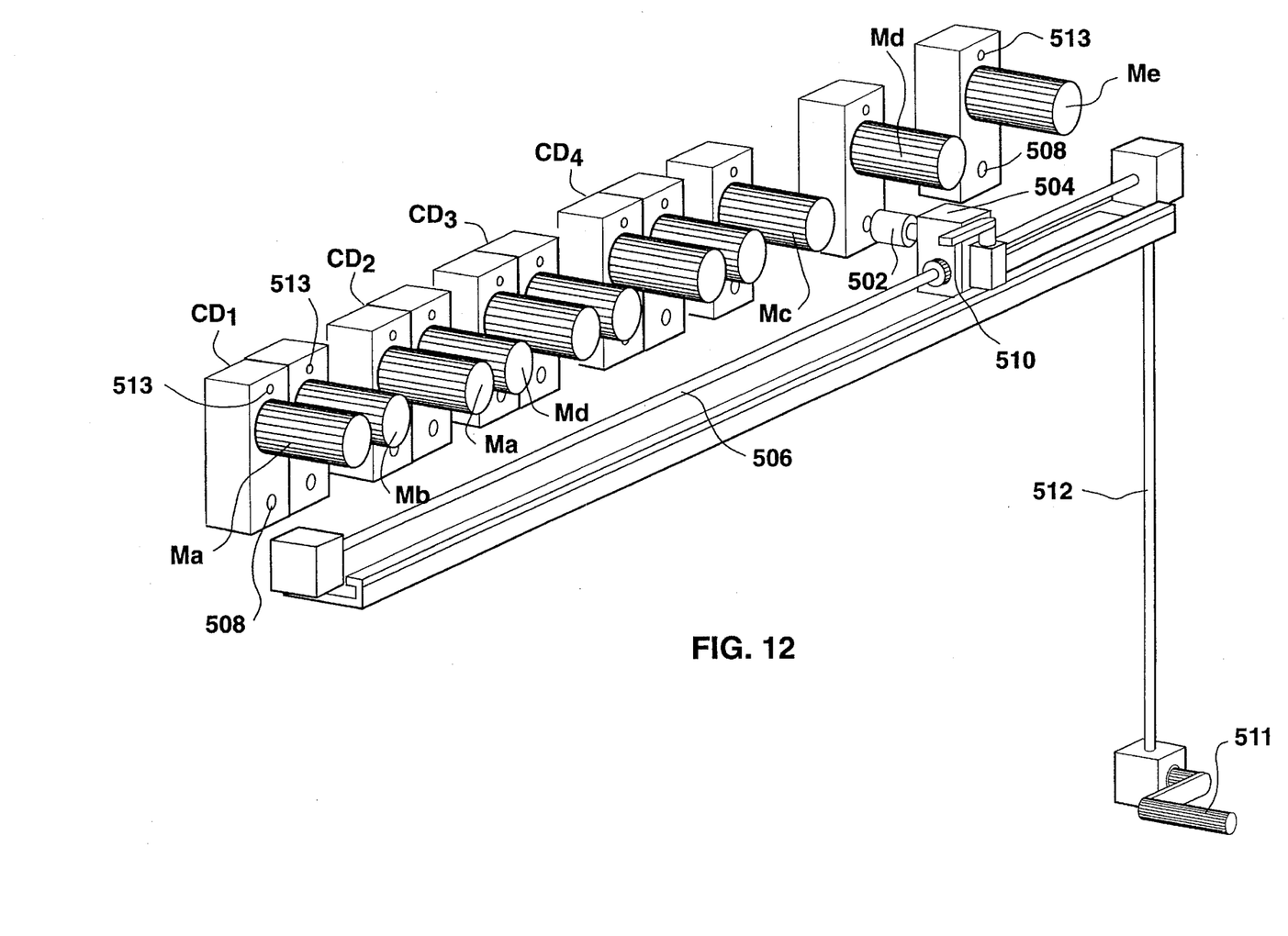
FIG. 12 is a perspective view illustrating the electrical motor drives for the carriages in the cart carrier, and a manual drive which may be selectively used in the event of the failure of an electrical motor in the carriage drives.
Figure 13:
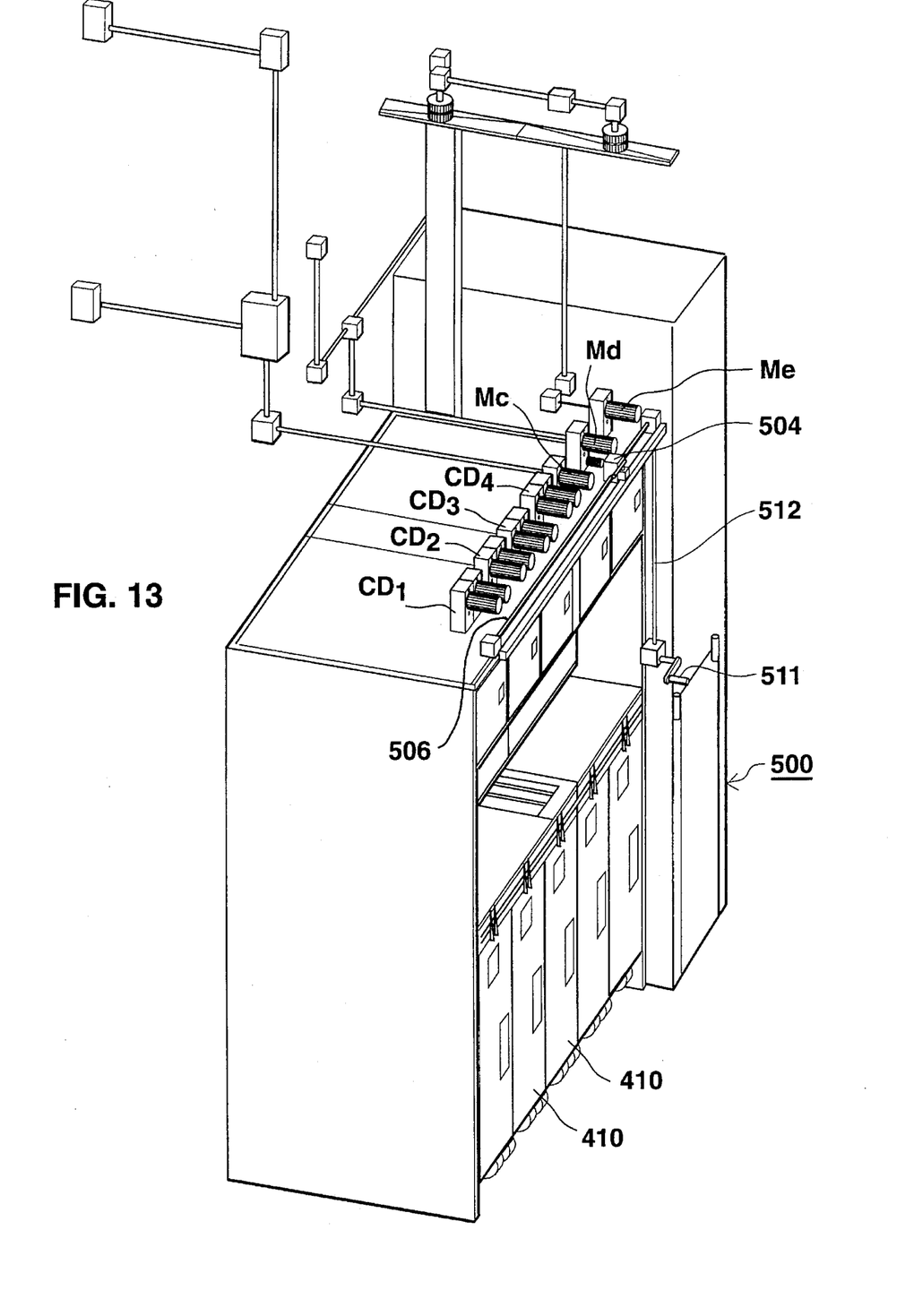
FIG. 13 illustrates the motor drives and the manual drive of FIG. 12 and the lift for vertically moving the cart carriers and their carts.

FIGS. 12 and 13 illustrate the electrical motor drives for the two carriages 322a, 322b (FIG. 1) in each of the two storage compartments 315a, 315b. Each carriage includes the two motors illustrated in FIGS. 10 and 11, namely motor Ma for driving the carriage, and motor Mb for driving the actuator levers 338 for the coupling pins 330 and locking pins 336. Accordingly, the electrical drive system includes four pairs of such motors, designated $CD_1$–$CD_4$, for the four carriages 322 in the two storage compartments 315a, 315b.

The electrical drive system further includes: motor Mc for driving the locking shaft 360 (FIG. 4) to move all the locking pins 336 to their released positions and to their secured positions; motor Md for driving the carriages transversely of the framework; and motor Me for driving the lift, shown at 500 in FIG. 13, for vertically moving the cart carriers and the carts, shown at 410, carried thereby.

FIGS. 12 and 13 illustrate a standby manual drive which may be used for any of the foregoing motors in case of a malfunction of one of the motors. The standby manual drive includes a coupling member 502 carried by a slidable housing 504 movable along a shaft 506 so as to be alignable with a socket 508 provided for each of the motors.

Slidable housing 504 includes a pivotal member 510 which may be pivoted to a coupling position or an uncoupling position. FIG. 12 illustrates the handle in its coupling position, wherein it couples shaft 506 to the adjustable coupling member 502 via transmission elements within the slidable housing. When the handle 510 is pivoted to its uncoupling position, it releases the coupling to shaft 506 and permits housing 504 to be slid along the shaft to any selected position. Housing 504 includes a worm gear rotated by shaft 506 and in turn rotating the coupling member 502.

Thus, in the event any one of the motors illustrated in FIGS. 12 and 13 fails to operate properly, coupling member 502 may be manually positioned to engage the socket 508 of the failed motor, and the output shaft of the motor may be manually driven by rotating handle 511. Each of the motors includes a light indicator 513 to indicate whether the respective motor is functioning properly or improperly.

Figure 14:
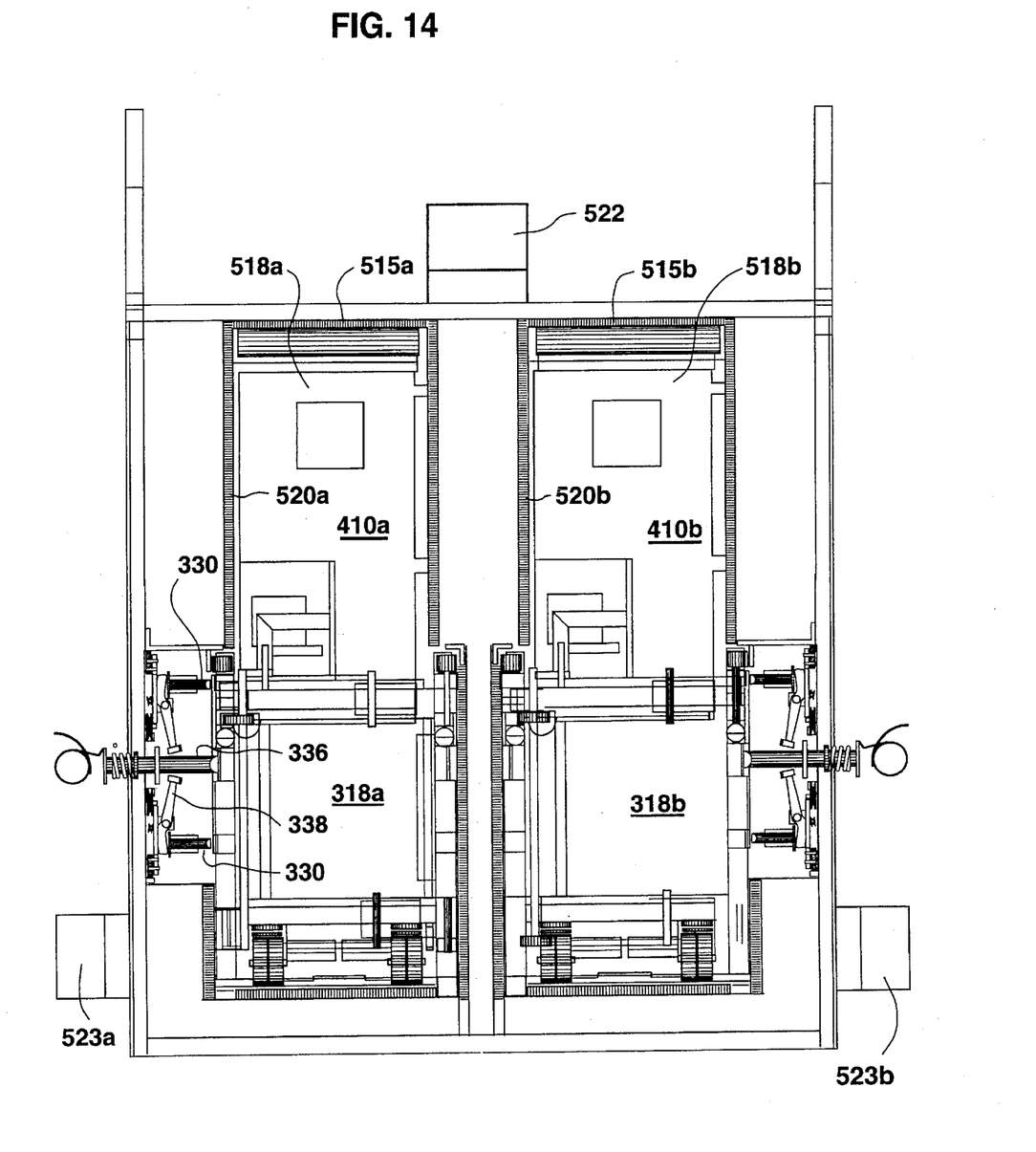
FIG. 14 is a view similar to that of FIG. 1 but illustrating a modification in the construction of the framework to enable the framework, together with a cart carrier therein, to form a thermal seal within the framework for thermally isolating a cooled zone in the apparatus from an uncooled zone.

FIG. 14 illustrates a further modification in the construction of the transfer apparatus, particularly in the framework for the two storage compartments shown at 515a, 515b, each for receiving one of the cart carriers 518a, 518b. In this modification, the framework includes an annular array of bristles, shown at 520a, 520b, for the two compartments. The bristles project from the inner face of the framework and are engageable with the outer face of the respective carts 410a, 410b and their respective cart carrier 318a, 318b. The arrangement is such that the cart and cart carrier, and the bristles engaged thereby, form a thermal seal or break. Thus, the food contents of several carts within a special zone may be cooled, e.g., by a cooling duct 522, without thereby also cooling the food contents of the carts in the adjacent cart carriers. The air is taken out from ducts 523a and 523b.

While the invention has been described with respect to several preferred embodiments, it will be appreciated that these are set forth merely for purposes of example, and that many other variations, modifications and applications of the invention may be made.

What is claimed is:

1. Transfer apparatus for transferring an article holder from one location to another location in a compartment, comprising:

a framework extending longitudinally of said compartment;

a carriage movable longitudinally of said framework;

a drive for said carriage;

a coupling device carried by said carriage and having a coupling position and a released position with respect to said article holder;

a locking device carried by said framework and having a locking position and a released position with respect to said article holder;

and an actuator for actuating said coupling device and said locking device said actuator comprising an actuator member movable to a plurality of positions when actuated, including: (a) a first position wherein the locking device is in said locking position of the locking device and the coupling device is in said released position of the coupling device; (b) a second position, wherein the locking device is in said locking position of the locking device, and the coupling device is in said coupling position of the coupling device; and (c) a third position, wherein the locking device is in said released position of the locking device, and the coupling device is in said coupling position of the coupling device.

2. The apparatus according to claim 1, wherein said actuator member is a lever pivotal about a pivot point on said carriage.

3. The apparatus according to claim 2, wherein one end of said pivotal lever engages said locking device to actuate it to its locking and released positions, and the opposite end of said pivotal lever engages the coupling device to move it to its coupling and released positions.

4. The apparatus according to claim 2, wherein said locking device comprises a locking pin movable by said pivotal lever to said locking position into engagement with said article holder for locking the article holder to the framework, or to said released position releasing the article holder from the framework.

5. The apparatus according to claim 4, wherein said coupling device comprises a coupling pin movable by said pivotal lever to said coupling position in engagement with said article holder for coupling the article holder to the carriage and thereby to move therewith, or to said released position releasing the article holder from the carriage.

6. The apparatus according to claim 5, wherein said lever is biased to its first position by a spring.

7. The apparatus according to claim 6, wherein said actuator means further includes a cable secured at its opposite ends to the framework and having a mid-portion extending over a roller carried by said pivotal lever, and over another roller carried by an actuator member pivotal to said framework and effective, thereby, to pivot said lever to said plurality of positions.

8. The apparatus according to claim 5, wherein said carriage includes a plurality of said pivotal levers secured to a shaft extending longitudinally of the carriage, and a plurality of said coupling pins each actuatable by one of said levers.

9. The apparatus according to claim 4, wherein there are a plurality of said locking pins carried by said framework at longitudinally-spaced points thereof and biased by springs to their locking positions, each of said locking pins including a projection engageable by said carriage when moving longitudinally of the framework for moving the locking pins to their released positions.

10. The apparatus according to claim 9, further including a locking shaft rotatable about its longitudinal axis and including a leaf spring effective in one rotated position of the locking shaft to engage all said locking pins and thereby to press them to their locking positions, said locking shaft further including a cable connected between it and each of the locking pins and effective in another position of the locking shaft to pull all the locking pins to their released positions.

11. The apparatus according to claim 1, wherein said drive for the carriage includes a motor supported on said framework and connected by a closed loop cable to said carriage.

12. The apparatus according to claim 1, wherein there are two of said carriages mounted for longitudinal movement along said framework on opposite sides of said locking device, each of said carriages including a said coupling device for coupling the article holder to the respective carriage.

13. The apparatus according to claim 1, wherein the article holder is a cart carrier and is formed with a first line of teeth extending longitudinally of the cart carrier engageable by said locking device, and a second line of teeth extending longitudinally of the cart carrier and engageable by the coupling device.

14. The apparatus according to claim 13, wherein said cart carrier includes a pivotal cart anchoring device at at least one of its ends comprising an inwardly directed anchoring tooth receivable within a recess formed in the respective end of a cart to be carried thereby for anchoring the cart to the cart carrier.

15. The apparatus according to claim 13, wherein said cart carrier further includes a drip pan at the lower end thereof for catching drippings from a cart carried thereby.

16. The apparatus according to claim 13, wherein the drive for said carriage includes a motor and a closed loop cable connected to said carriage and driven by said motor.

17. The apparatus according to claim 16, wherein said closed loop cable includes a spring section, and said actuator includes a tensioning member for varying the tension of the closed loop cable in order to expand or contract said spring section and thereby to control the effective length of said closed loop cable; said actuator member being coupled to said closed loop cable such as to be moved to one of said plurality of positions in accordance with the effective length of the closed loop cable.

18. The apparatus according to claim 16, wherein there are two of said carriages mounted for longitudinal movement along said framework on opposite sides of said locking device, each of said carriages including a said coupling device for coupling the cart carrier the respective carriage; each of said carriages being driven by a separate electrical motor.

19. The apparatus according to claim 18, further including a manual drive selectively alignable with each of said motors for manually driving the carriage in the event of failure of the electrical motor.

20. The apparatus according to claim 13, wherein said framework includes an annular array of bristles projecting from its inner face engageable with the outer face of an article holder and a cart carrier received within the framework, such that the cart carrier so received, and the bristles engaged thereby, form a thermal seal within the framework.

* * * * *